United States Patent

Dent

[11] Patent Number: 5,825,889
[45] Date of Patent: Oct. 20, 1998

[54] USE OF DUPLEX CIPHER ALGORITHMS FOR SATELLITE CHANNELS WITH DELAY

[75] Inventor: Paul W. Dent, Pittsboro, N.C.

[73] Assignee: Ericsson Inc., Research Triangle Park, N.C.

[21] Appl. No.: 731,465

[22] Filed: Oct. 15, 1996

[51] Int. Cl.⁶ ........................................................ H04L 9/00
[52] U.S. Cl. .............................................. 380/49; 380/50
[58] Field of Search .................................. 380/49, 21, 34, 380/50

[56] References Cited

U.S. PATENT DOCUMENTS

| 5,060,266 | 10/1991 | Dent . |
| 5,081,679 | 1/1992 | Dent . |
| 5,091,942 | 2/1992 | Dent . |
| 5,230,003 | 7/1993 | Dent et al. . |
| 5,282,250 | 1/1994 | Dent et al. . |
| 5,414,729 | 5/1995 | Fenton ............................. 380/34 |
| 5,528,693 | 6/1996 | Leopold ........................... 380/48 |

FOREIGN PATENT DOCUMENTS

| 0 595 351 | 5/1994 | European Pat. Off. ........ H04B 7/212 |
| WO87/07796 | 12/1987 | WIPO .............................. H04L 9/02 |
| WO92/02088 | 2/1992 | WIPO .............................. H04L 9/00 |

OTHER PUBLICATIONS

PCT International Search Report re: PCT/US97/16351 dated Feb. 24, 1998.

*Primary Examiner*—David C. Cain
*Attorney, Agent, or Firm*—Burns, Doane, Swecker & Mathis, L.L.P.

[57] ABSTRACT

An apparatus and method for ciphering traffic exachanged in both directions between a satellite/cellular telephone and a ground station networkusing an orbitial satellite. A buffer memory is provided at either the mobile telephone station or the ground network station or both. The buffer memory is used to store the deciphering bits output from a duplex ciphering algorithm at the time the ciphering bits are generated. The stored ciphering bits are used to decipher a later-to-be-received traffic information block. The delay in using stored deciphering bits is determined for each call at call set-up to the nearest integer number of block periods by measuring the loop propagation delay from the ground station to the mobile telephone station during an exchange of signals at call set-up.

17 Claims, 12 Drawing Sheets

USE OF DUPLEX CIPHER ALGORITHMS FOR SATELLITE CHANNELS WITH DELAY

FIELD OF THE DISCLOSURE

The invention concerns ciphering traffic exchanged in both directions between for example a satellite/cellular telephone and a ground station network using an orbital satellite, in which the loop propagation delay is much longer than the cipher block period. In particular the invention solves the problem of allowing two satellite/cellular telephones to communicate directly with each other, thus avoiding a double-hop delay if the call were relayed through the satellite twice using a ground station.

BACKGROUND OF THE DISCLOSURE

At the present time, there are many proposals to launch orbiting satellites which would support communication with mobile or handheld phones. FIG. 1 illustrates a block diagram of a satellite communications system. An orbiting satellite 110 is in communication with at least one ground station or outstations called the HUB 100 as well as with a number of portable mobile stations or phones 120. The phones are each serviced by an appropriate antenna beam from a multiple spot-beam antenna on the satellite providing high gain in the direction of each phone. The HUB communicates with the satellite using, for example, C-band or K-band frequencies, while the satellite communicates with the phones using, for example, L-band (uplink) and S-band (downlink) frequencies. While a high percentage of calls would be between fixed (Public Switched Telephone Networks PSTN or wireline) subscribers and satellite terminals, a percentage of calls would be between pairs of satellite terminals. In the latter case, it is desirable to avoid the double delay of the signal propagating from one terminal to the satellite; being relayed by the satellite to the ground network switch; back from the switch to the satellite and finally from the satellite to the second terminal. With this method, the signal propagates over four times the earth-satellite distance, increasing speech delay.

In cellular systems, propagation delays are sufficiently short that a mobile phone can cipher and decipher messages using the same block counter value to cipher a transmitted block and to decipher a received block, and the network or base station can do likewise. In the above mentioned GSM system for example, the TDMA frame period is approximately 4.6 ms, which translated to a distance at the speed of light equates to 1380 Km, or 690 Km each way. Cellular cell radii are rarely more than 30 Km, but distances from a satellite phone to a satellite and down to the ground again can be 2000 KM for low orbiting satellites to 80000 Km for geostationary satellites.

A duplex cipher algorithm such as the A5 algorithm specified for the European digital cellular system known as GSM employs a block counter together with a secret session key to produce ciphering bits for ciphering traffic data blocks. The block counter is incremented for each traffic block, which may be for example a signal burst transmitted once in each Time Division Multiple Access frame period. By the time a signal transmitted from a satellite phone is transponded by the satellite and is received once more at the ground, the block counter with which the signal was ciphered will be out of data compared to the current block counter by many block periods.

U.S. patent application Ser. No. 08/581,110 describes avoiding the double-hop delay for communication between two mobile stations via an orbiting satellite by relaying their signals directly to one another. The application discloses reformatting the signals on board the spacecraft when the uplink format transmitted by a mobile station is different than the downlink format expected by the mobile stations, such reformatting also comprising a delay where necessary to permit a time-duplex solution at both mobiles whereby they are not required to transmit and receive at the same time, but rather in short bursts in alternating directions.

U.S. patent application Ser. No. 08/681,916 entitled "Method and Apparatus For Enabling Mobile-to-Mobile Calls in a Communications System", which is incorporated herein by reference, discloses the problem of, and a solution for, establishing a ciphering key in common between two mobile stations having different authentication keys.

The use of duplex cipher algorithms in cellular systems for enciphering traffic in both directions using the same session key is known in the prior art. For example, such an algorithm is described in U.S. patent application Ser. No. 07/708,876, which is incorporated herein by reference in its entirety.

The GSM digital cellular standard employs a duplex cipher algorithm known as A5, the general structure of which is described in: "Applied Cryptography—Second Edition" by Bruce Schneier (John Wiley & Sons). This structure is used in this application.

U.S. Pat. No. 5,060,266 describes methods of ensuring continuous synchronization between the block counters at the two ends of a communications link when employing such duplex ciphering algorithms. This patent is also incorporated herein by reference in its entirety. However, it does not disclose or solve the problem of maintaining synchronism at both ends when their separation in space, translated to a time delay at the speed of light, is large compared with the required synchronization accuracy.

U.S. Pat. No. 5,081,679 discloses means to resynchronize the block counter used for encryption when a moving station leaves the service area of one base station and enters that of another having an unsynchronized counter. This patent is also hereby incorporated by reference herein in its entirety. It solves the problem of changing the block counter in the mobile from a first counter phase to a second counter phase to align the block counter with the counter in a new base station upon handoff, but does not disclose or solve the problem of communicating in cipher mode with a base station at larger distances than the block counter tick period times the speed of light.

U.S. Pat. No. 5,091,942 and its continuation U.S. Pat. No. 5,282,250 describe methods of establishing a common session key between a network station and a mobile station, during an authentication process which verifies as genuine the identity of a mobile station to a network station and likewise the network station identity to the mobile station. Both the above patents are hereby incorporated by reference in their entirety herein. The methods described rely upon the mobile station and the network both having access to an authentication key or A-key in common, which however it is not wished to expose to attack by releasing it for encrypting a particular call. Neither of the above incorporated patents describes establishing a common key between a first mobile and a second mobile which do not have an A-key or any secret information in common.

The aforementioned emissions or deficiencies of the prior art are alleviated when practicing the invention described herein.

SUMMARY OF THE DISCLOSURE

According to a first aspect of the invention, a buffer memory is provided at either the mobile telephone station or the ground network station or both. The buffer memory is used to store the deciphering bits output from a duplex ciphering algorithm at the time the ciphering bits are generated. The stored ciphering bits are used to decipher a later-to-be-received traffic information block. The delay in using stored deciphering bits is determined for each call at call set-up to the nearest integer number of block periods by measuring the loop propagation delay from the ground station to the mobile telephone station during an exchange of signals at call set-up.

According to a second aspect of the invention, a buffer memory is provided at a first and a second mobile satellite telephone station. The buffer memory is used at the first mobile station for storing a first output from a duplex ciphering algorithm while using a second output for ciphering transmissions. The buffer memory at the second mobile satellite telephone station is used for storing the second output from an identical duplex ciphering algorithm while using the first output for ciphering transmissions. The stored outputs from the ciphering algorithms are then recalled at both mobile stations after a delay of a whole number of block periods and used for deciphering signals received from each other. The delay is determined by a ground network station during exchange of signals with both mobile stations at call set-up, whereby the first mobile station is identified as originating the call and stores the first cipher output and the second mobile station is identified as terminating the call and stores the second cipher output.

According to a third aspect of the invention, mobile-to-mobile calls begin by establishing contact between a ground network and both mobile stations in a mode ciphered for each station individually using separate session keys, and after establishing the loop delay for direct mobile-mobile connections, the ground network provides a common session key and the loop delay parameter to permit direct mobile-to-mobile calls using enciphering.

In another implementation of the invention, a block counter supplies a block count value to a key generator along with a session key. The key generator combines the block count with a session key and outputs ciphering bits which are used to encipher data transmitted from a first station. The block count is also applied to an arithmetic unit together with a predetermined delay count to regenerate an earlier value of the count. The regenerated earlier count value is applied to a key generator along with a session key to generate keystream bits for deciphering a data burst received at the first station but transmitted earlier by a second station. The reception is delayed by the propagation time of the signal from the second to the first station and is equal to the predetermined delay value expressed to the nearest whole number of block count periods. The predetermined delay value is computed by a ground network that communicates with both the first and the second station during initial establishment of communications and communicates the computed delay value to both stations along with a common session key. The first and second stations are then commanded to communicate autonomously with each other using the session key and delay value sent from the ground network to affect encryption and decryption of traffic.

BRIEF DESCRIPTION OF THE DRAWINGS

These and other features and advantages of the invention will be readily apparent to one of ordinary skill in the art from the following written description, used in conjunction with the drawings, in which.

DETAILED DESCRIPTION

Figure 1:
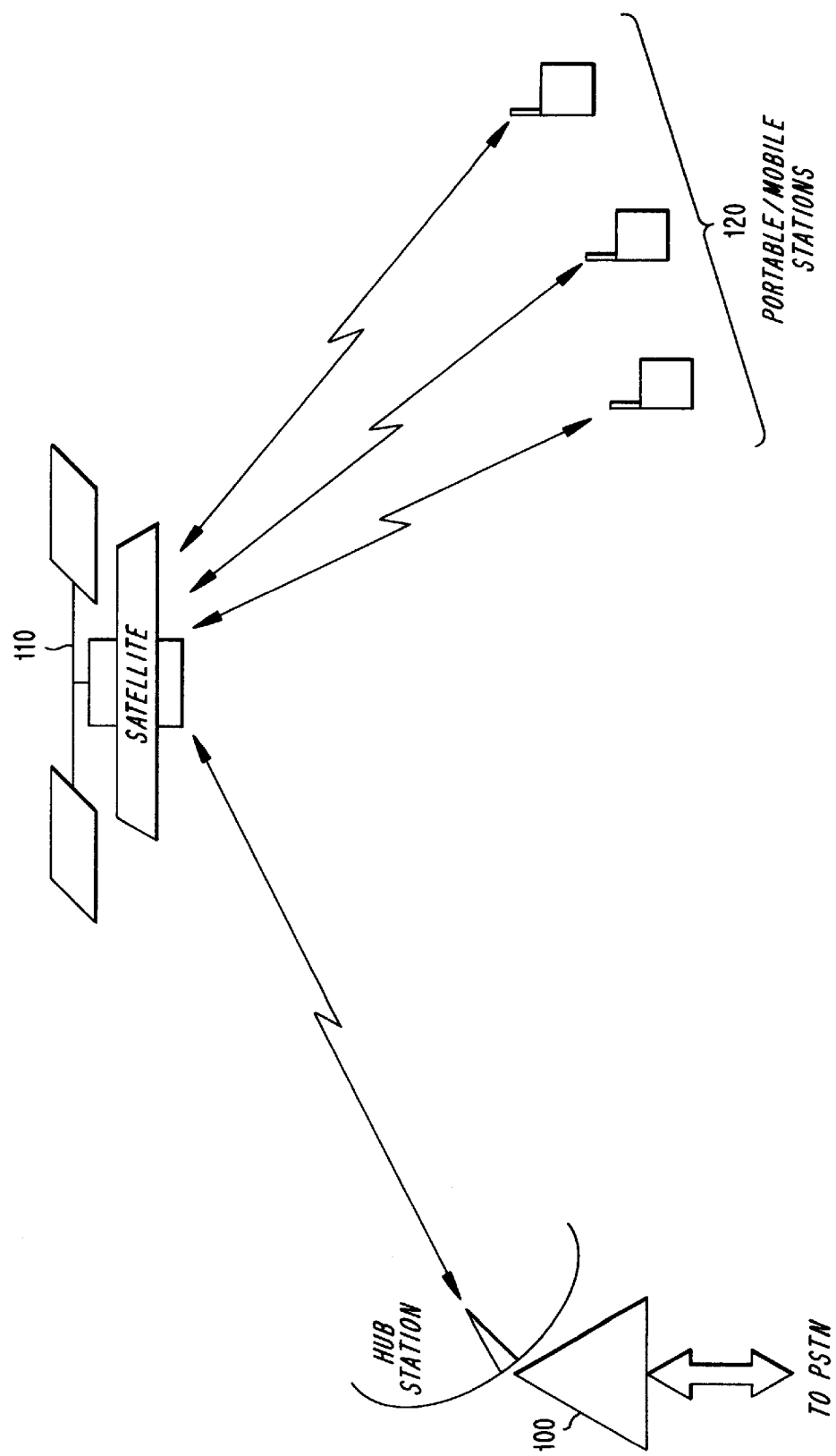
FIG. 1 illustrates a satellite communication system.
Figure 2:
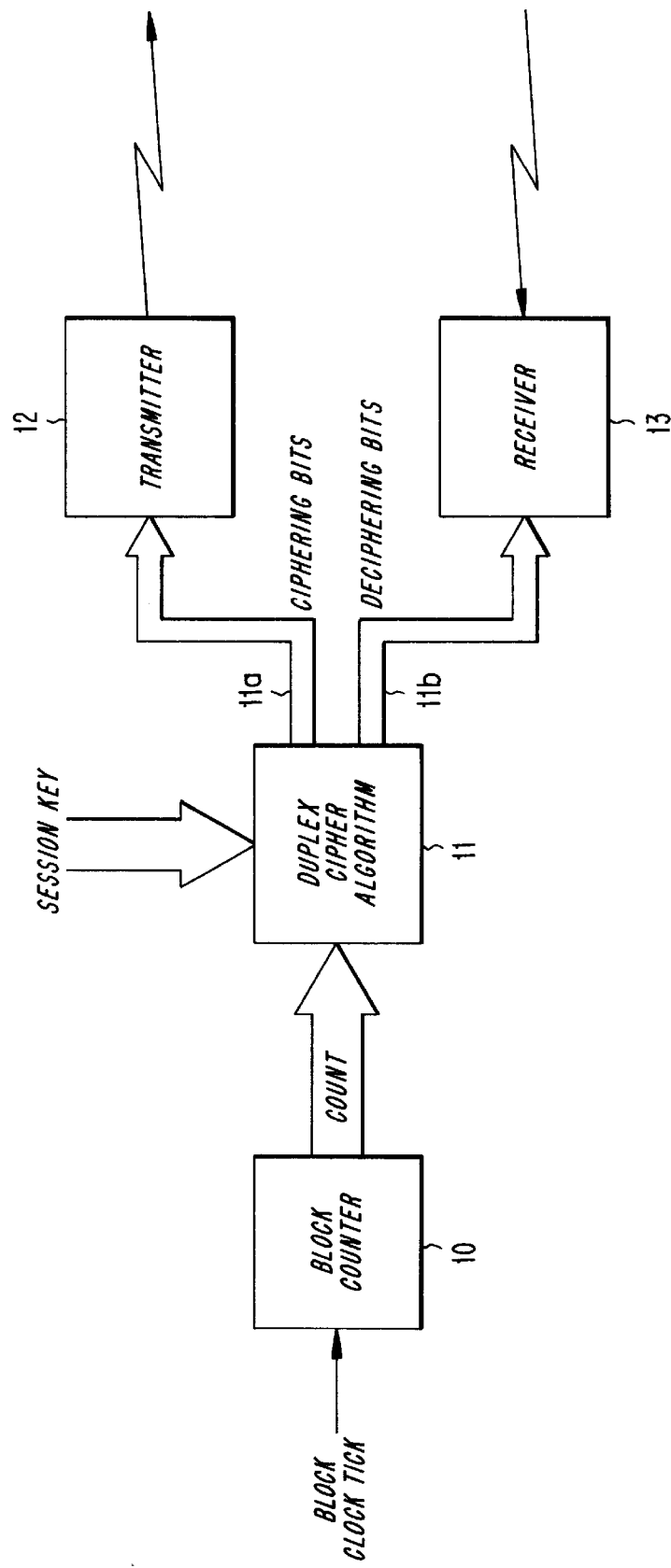
FIG. 2 illustrates a prior art block-counter based cipher.

FIG. 2 illustrates a prior art duplex cipher employed to cipher a transmitted signal and to decipher a received signal. A block counter 10 is incremented by applying the block clock tick pulse which changes the previous value of a multi digit value COUNT to its next value in sequence. The count sequence is not necessarily that of a simple binary or decimal counter that increments by 1 each tick, and can comprise multiple radix counters and counters where more than one digit is incremented at a time. The counter can also in principle be a pseudo-random sequence generator, although as will become clear, an advantage of the block-count driven cipher is precisely that past or future values of COUNT can easily be determined by adding or subtracting a time displacement value from the current count value, which is more straightforward with sequential-number count order and more difficult with pseudo-random count sequencing. A simple binary counter is thus the preferred arrangement of block counter 10.

After each block clock tick, the new count is applied to a duplex cipher algorithm 11 together with a session key established for and known only to the stations in mutual communication. The duplex cipher algorithm 11 computes two multi-digit outputs labelled 11a and 11b. One output 11a is fed to a transmitter 12, where it is used to encipher transmitted traffic, by, for example, modulo-2 adding binary digits of the cipher output bit-by-bit to corresponding bits of digitized traffic information. Other means of employing cipher bits to encipher traffic may of course be employed, such as using the cipher bits to control an order of permutation of transmitted signal elements, or applying the cipher bits together with traffic bits block-wise to a block-combinatorial algorithm such as the DES algorithm.

The other output 11b from the duplex cipher algorithm 11 is meanwhile applied to a receiver 13 and is used to decipher a block or burst of received traffic information by inverting the encryption process. If bitwise modulo-2 addition is used for enciphering, then the same is used for deciphering as modulo-2 addition is the same as its own inverse, modulo-2 subtraction. Otherwise, if another form of addition is used for ciphering then the equivalent subtraction operation needs to be used for the deciphering operation. For example, if a signal-element permutation is used for ciphering, then an inverse permutation is used for deciphering.

FIG. 2 illustrates only one end of a communications link between two stations. The second station (not shown) would use exactly the same arrangement except that the output 11a would be fed to the second receiver for deciphering while the output 11b would be fed to the second transmitter for enciphering. Reversing the use of the outputs 11a and 11b allows two way traffic to be exchanged in ciphered mode only if the propagation delay is small compared with the time between block clock ticks. Therefore, the prior art duplex cipher of FIG. 2 is not operable when propagation delays between the two ends of the link are many block periods. For example, if a first device according to FIG. 2 enciphers with a block count equal to 1000, and the enciphered signal propagates to a second device according to FIG. 2 with a propagation time of 50 block counts, then the block counter of the second device, if synchronized to that of the first device, would have moved on to the value 1050, which is incorrect for deciphering. The block counter of the second device must therefore be retarded by 50 block counts so that, when the first device is enciphering with a block count of 1000, the second device's block counter has attained the value 950 and is deciphering a block transmitted 50 counts earlier. The second device would then however be enciphering blocks for transmission to the first device with the same retarded block count of 950; after 50 block counts of propagation delay, these blocks enciphered with block count =950 arrive at the first device after its block counter has moved on from 1000 to 1050, an error of 100. It is thus impossible to synchronize the two ends by advancing or retarding one or both of the cipher machines relative to the other.

Figure 3:
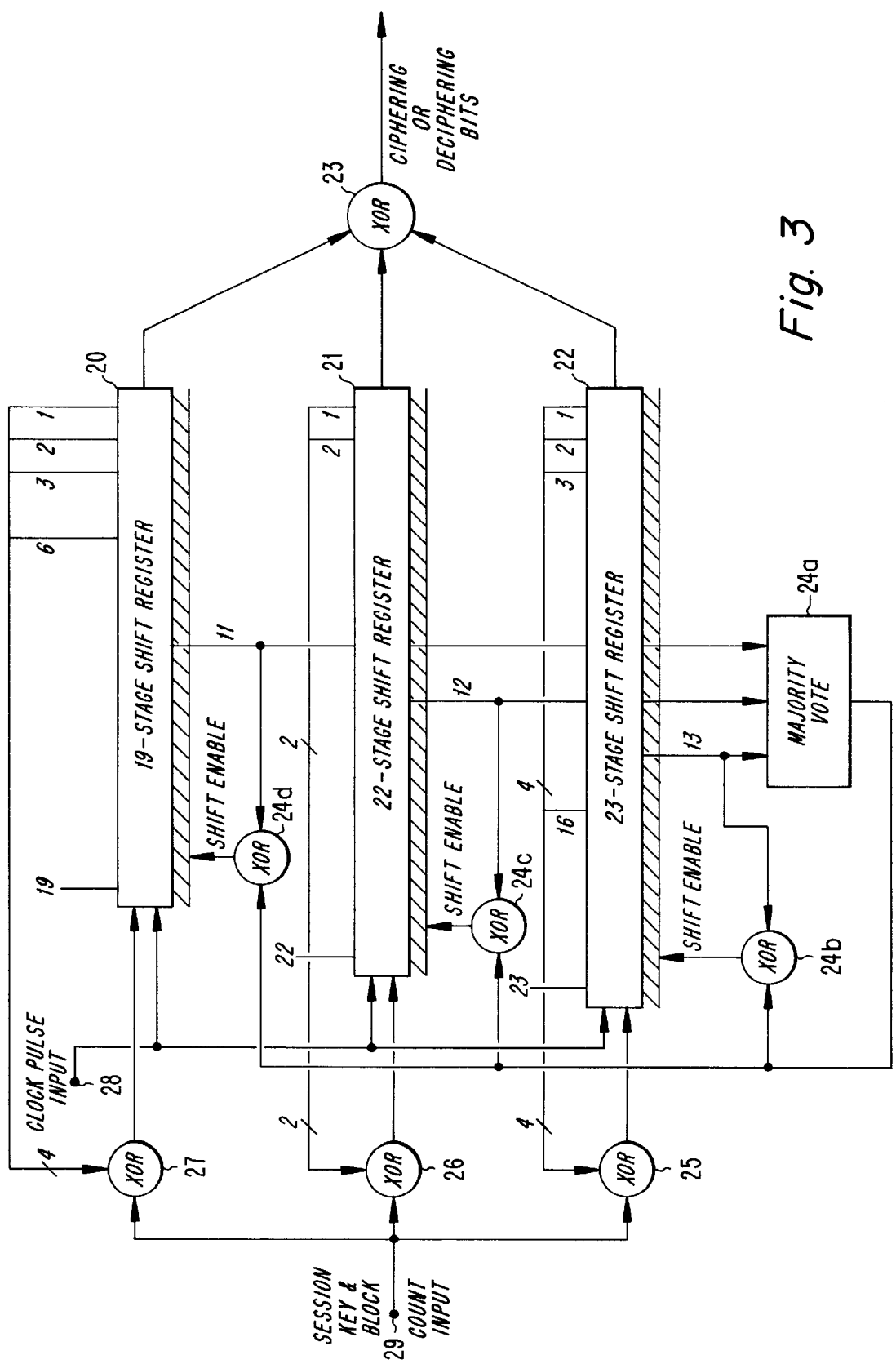
FIG. 3 illustrates an exemplary duplex cipher algorithm.

FIG. 3 illustrates as an exemplary duplex cipher algorithm the A5 algorithm described above. Three, linear feedback shift registers 20,21,22 of respective lengths 19,22 and 23 stages are clocked by clock control circuitry 24a,24b,24c, 24d to generate three output bits at a time, which are exclusive ORed in an XOR circuit 23 to generate a one bit output per clock period. Sequential output bits obtained after an initialization process form the keystream for ciphering and deciphering.

The clock control circuitry 24 comprises a majority vote circuit 24a that compares register 20 bit 11, register 21 bit 12 and register 22 bit 13 and decides whether there are more binary '1's than binary '0's. For example, if register 20 bit 11 and register 22 bit 13 were '1's, there are at least two '1's so '1's are in the majority and the majority vote circuit outputs a '1'. However, if zeros are in the majority, the majority vote circuit 24a outputs a zero.

The output of the majority vote circuit 24a is compared with register 20 bit 11 in an XOR gate 24d. If the values match, it indicates that bit 11 of register 20 is one of the majority values and a '0' is produced from XOR gate 24d, enabling the register 20 to shift when a clock pulse is applied to a clock pulse input 28. Likewise, XOR gates 24c and 24b determine respectively whether bit 12 from register 21 and bit 13 from register 22 belong to the majority and if so, their respective registers are enabled to shift. The effect of clock control circuitry 24a,b,c,d is thus that at least two out of three of the registers, i.e. the majority of them, shift right upon applying a clock pulse to the input 28.

Figure 4:
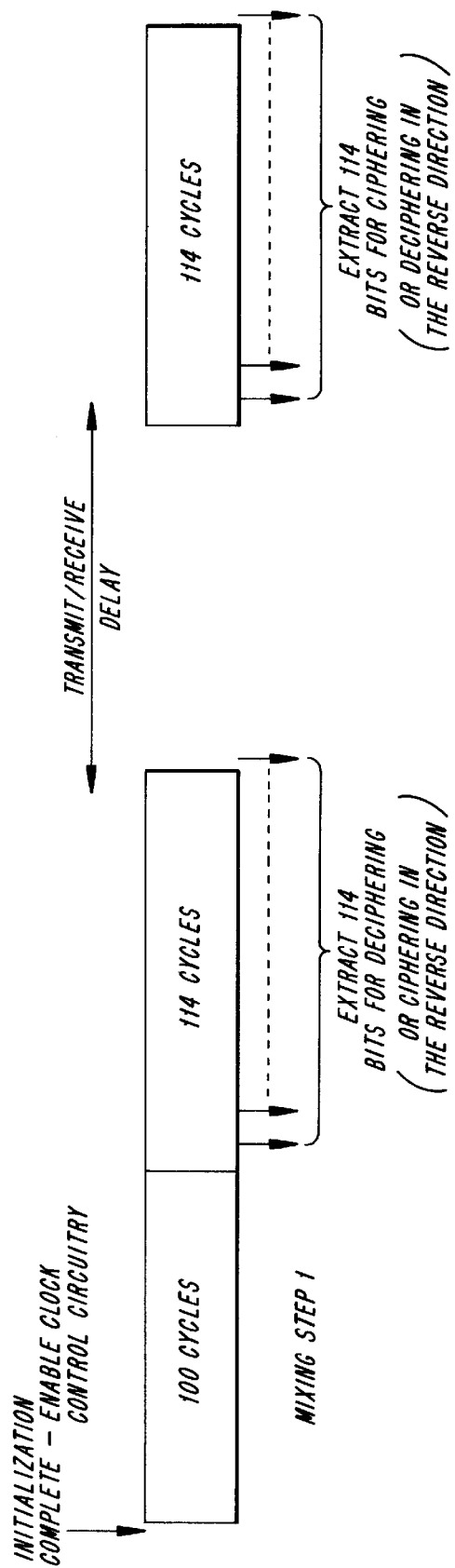
FIG. 4 illustrates the number of clock cycles applied for generating ciphering and deciphering bits.

The above-described clock control circuitry is used after initialization of the register starting states using the session key and the block count, and a number of clock pulse applied according to FIG. 4. After initialization, 100 clock pulses are applied to displace the registers from their starting states by deterministic but hard to predict amounts. Then, a further 114 clock pulses are applied, after each of which a keystream bit is extracted from XOR gate 23. The extracted 114 bits are then used to decipher traffic in one direction or to encipher traffic in the other direction. In a subsequent application of 114 clock pulses, a further 114 bits are extracted from the XOR gate 23 and used to encipher traffic in a first direction or to decipher traffic in the second direction.

Figure 5:
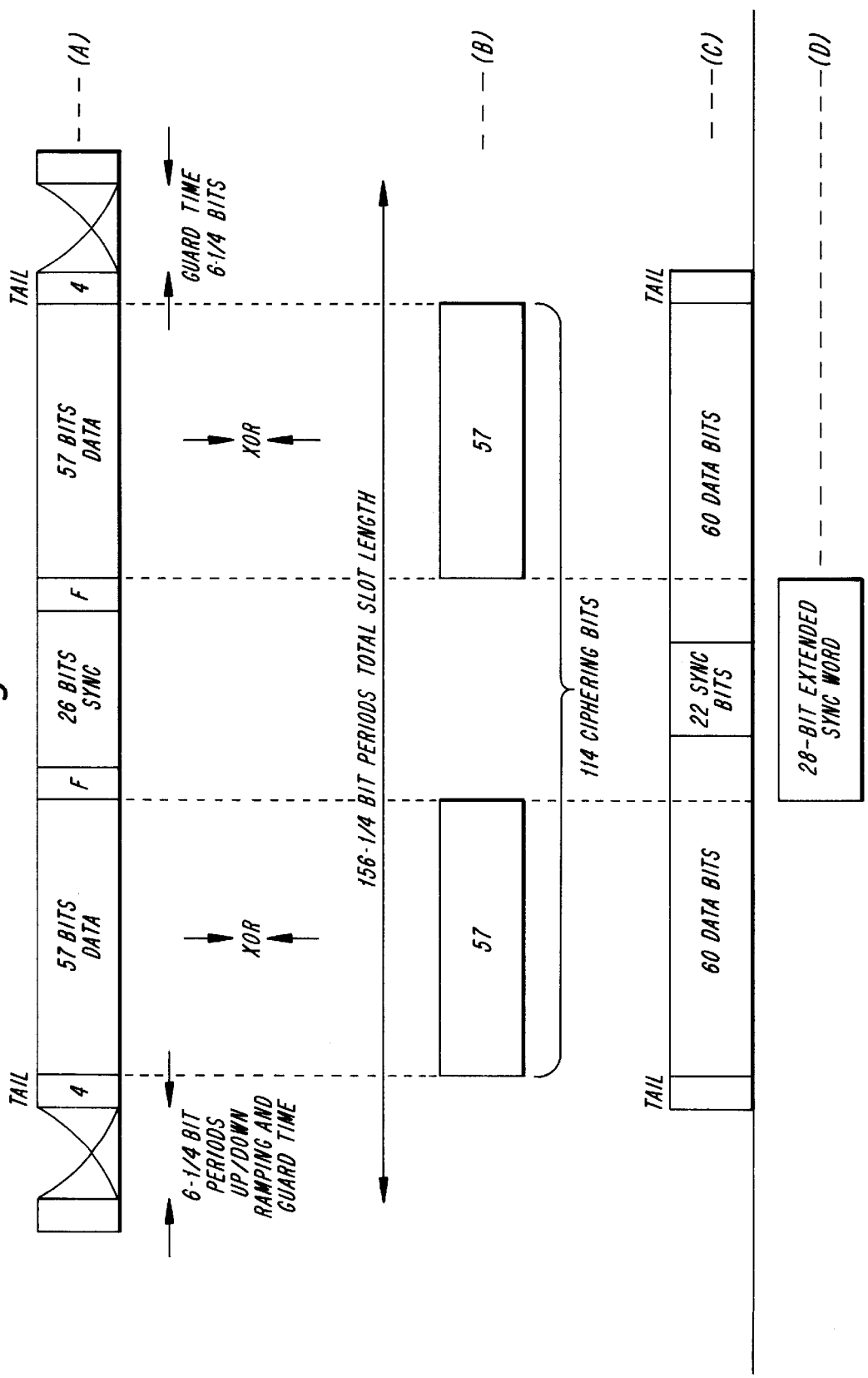
FIG. 5 illustrates a GSM TDMA burst format.

FIG. 5 is the GSM TDMA burst format showing how the 114 keystream bits are applied to cipher 57+57 bits of traffic information. The slot format (A) comprises a central, 26-bit syncword used for synchronization and equalizer training. On each side of the syncword, the flag bits F indicate whether the burst contains digitized speech, Fast Associated Control Channel (FACCH) messages or half speech and half FACCH. On either side of the flag bits lie 57 data bits, making 114 bits in total. Only these data bits are encrypted by XORing them with the 114 keystream bits, which are split into two corresponding blocks of 57 keystream bits shown at (B). At the ends of the burst, 4 tail bits are added to allow echoes in the propagation channel to die away, and then a further 6.25 bit periods of up/downramping time are allowed, which also serves as guard time between slots to allow some small variation of slot timing between adjacent slots without creating interference.

The initialization step comprises clearing the registers and then loading them with the session key and block count for the current frame. The 64-bit session key and 22-bit block count are concatenated to form an 86-bit initialization sequence which is applied bit serially to input 29 where the bits become XORed into the register feedback paths. To ensure that every register is effected by every bit, all three registers are shifted during initialization with the 86 key+ count bits. Thereafter, the shifting of the registers during the 100 mixing cycles and 228 keystream extraction cycles depends on clock control circuitry 24a,b,c,d as previously described.

In FIG. 5, the format labelled (C) is the GSM-derived burst format adapted for satellite communications as disclosed in U.S. patent application Ser. No. 08/501,575 which is incorporated herein by reference.

To improve the communications efficiency in satellite mode, the two flag bits and four of the sync bits are removed and the data content of the slot is increased from 57+57 bits to 60+60 bits. The reduced sync word length of 22 bits is sufficient for equalizer training for the satellite channel, which suffers less time dispersion. The flag bits are not needed to discriminate between speech and FACCH, which is performed instead using the invention disclosed in U.S. Pat. No. 5,230,003 which is incorporated herein by reference in its entirety.

It can be seen that format (C) comprises 3 bits lying on either side of the sync word that do not overlap with corresponding keystream bits from respective 57-bit keystream blocks (B). Thus, if minimum change is made to the GSM hardware that implements burst formatting and encryption, those 3+3 bits do not get enciphered. When account is taken of the diagonal interleaving patterns disclosed in U.S. patent application Ser. No. 08/501,575 however, the unencypted bits are isolated bits in the output sequence of an error correction encoding process, the neighboring bits to which are enciphered. Since it is not possible to perform error correction decoding based on one isolated plain text coded bit when the surrounding coded bits are enciphered, there is no significant loss of security in not ciphering the three extra data bits. It is more important however that the 3+3 bits in question should be masked differently for signals using the same frequency in different cells or beams, the so-called co-channel interferers, as the error correction coding will not act to help filter out co-channel interference if the interference is coded identically. In FIG. 5, an extended syncword (D) comprises the normal 22 sync bits, which are also desirably different among a group of co-channel interferers, extended to 28 bits by adding 3 bits at each end that overlap the 3+3 extra data bits and become exclusive ORed with the extra data bits during burst building. The 3+3 syncword extension bits are also chosen deliberately to differ between co-channel interferers so as to obtain the interference discrimination advantage of the error correction code for these three bits.

It would of course be a simple modification to the A5 algorithm of FIG. 3 to generate 240 keystream bits for ciphering and deciphering, but the arrangement of FIG. 5 (B+C+D) is preferred when existing hardware designs for are to be minimally modified to implement a satellite communication mode.

Figure 6:
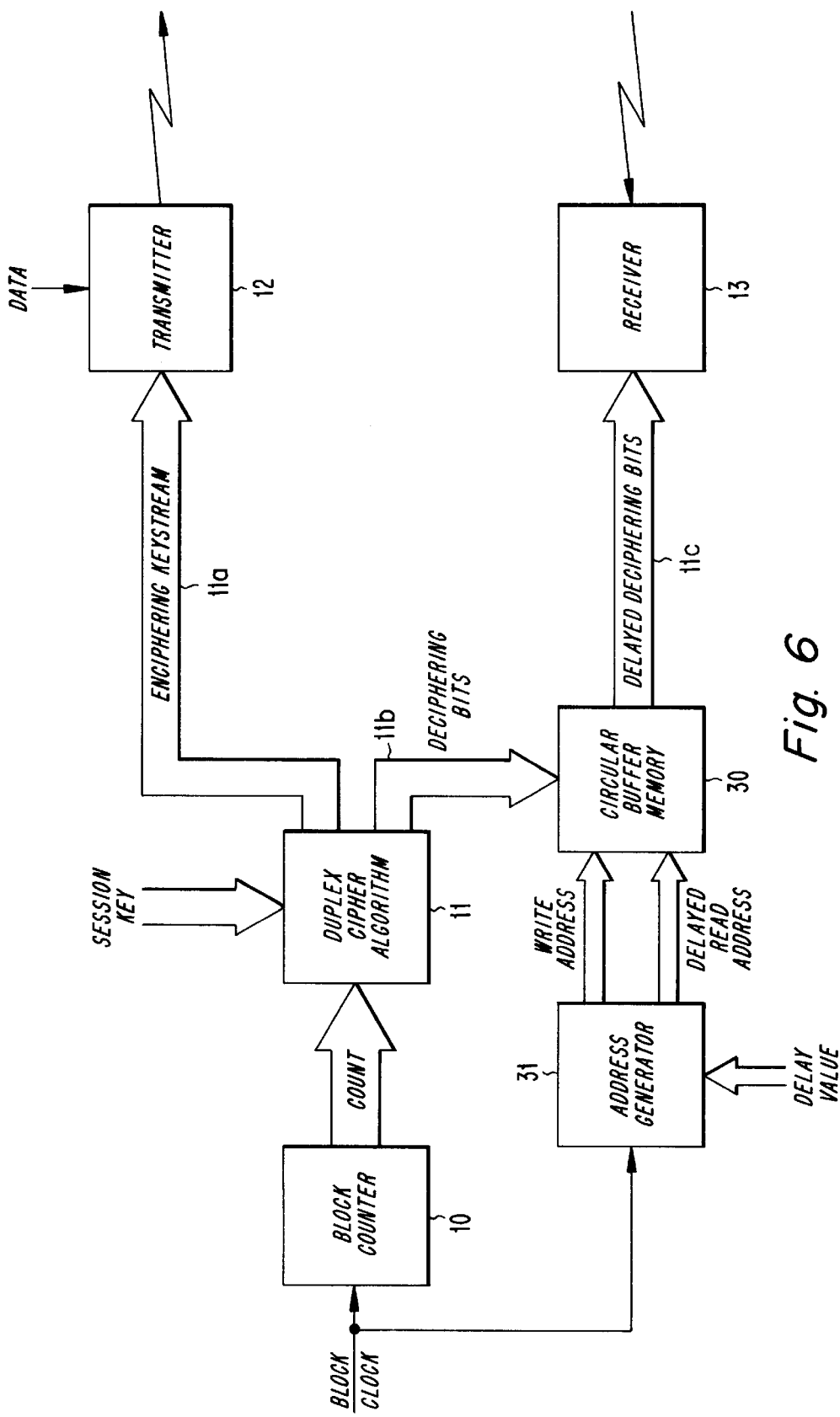
FIG. 6 illustrate a modified duplex cipher machine according to one embodiment of the present invention.

FIG. 6 illustrates the changes needed to the prior art duplex cipher machine of FIG. 2 to achieve a first implementation of the invention, with the aim of allowing duplex communication over much greater distances. An address generator 31 generates a write address and a read address to a circular buffer memory 30. The address generator increments the read and write addresses each time a block clock pulse is applied to increment the block counter 10. The read address is equal to the write address minus a constant delay value determined for each call. The addresses are computed modulo-N, where N is the size of the circular buffer memory in ciphering bit blocks. For example, if ciphering bit blocks contain 114 bits, as generated using the logic of FIG. 2 and N is 64, then the size of the memory is 114×64 bits or 912 bytes. The value N=64 sets the maximum value that the delay value can attain, and thus sets the maximum loop propagation delay and thus loop distance between a first station communicating with a second similar station via an orbiting satellite. If the actual delay for a particular call is, for example, 51 block counts, then the read address is related to the write address by the equation $$\text{Read Address} = |\text{Write address} - 51|_{64}$$
$$= |\text{Write address} + 13|_{64}$$

Therefore, the read address may equally be derived from the write address by modulo-N adding the N's complement of the delay value, in this case, 13.

The duplex cipher machine at the other end of the link in communication with the machine of FIG. 6 is assumed to be of identical function to that of FIG. 6, except that the second machine would use the keystream 11$b$ for enciphering transmissions instead of the keystream 11$a$, and the keystream 11$a$ would be routed to the memory 30 to be used, after a delay for deciphering received data. The same delay value may be used at both ends and is then the one-way propagation delay from a first communicating device through the satellite relay station to the second communicating device. Alternatively, different delays may be used as long as their sum equals the two-way propagation delay and their block counters are adjusted to ensure cipher synchronization at both ends, which, because of the delay memories, is now possible when practicing the invention.

Figure 7:
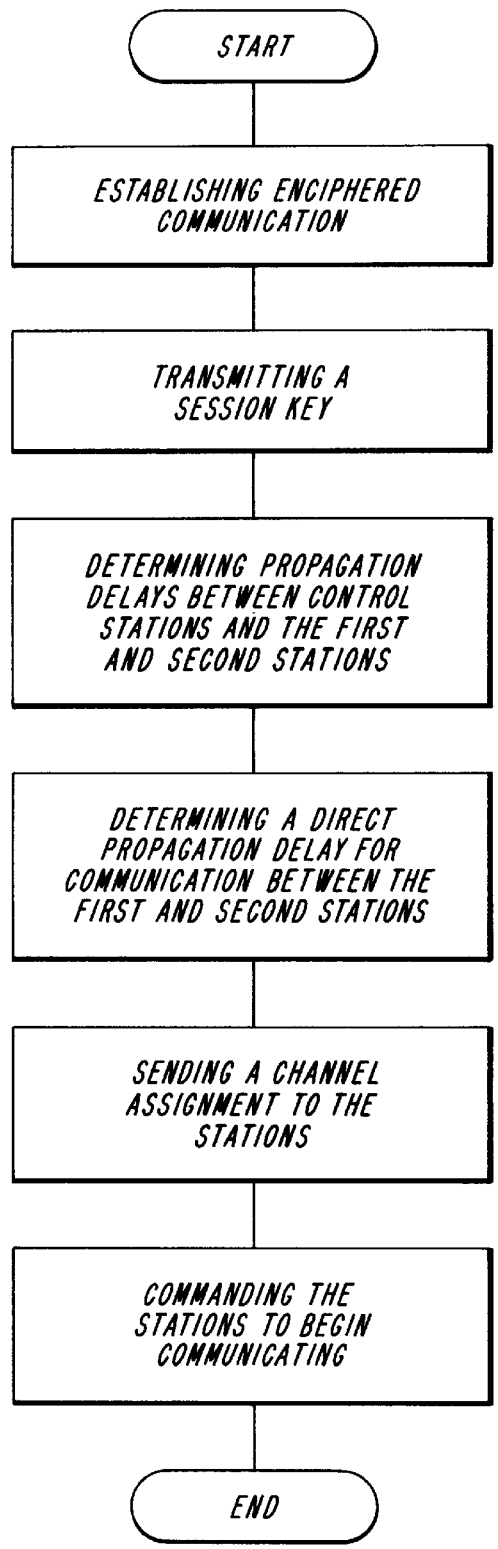
FIG. 7 is a flow chart illustrating one embodiment of the present invention.

The present invention described above will be further explained with reference to FIG. 7 which illustrates a method of communicating cipher-protected information between a first transmitter-receiver station and a second transmitter-receiver station using a network of control stations. Enciphered communication is first established between the network of control stations and the first station and separately between the network of control stations and the second station. A session key from the network of control stations is sent to the first station and separately to the second station. The propagation delays between the control station network and the first station are determined and the propagation delays between the control station network and the second station are determined. The propagation delays are processed to determine a direct propagation delay for communication between the first and second stations without involving the control station network. The direct propagation delay is then sent from the control station network to the first station and separately to the second station. A channel assignment is then sent from the control station network to the first station and separately to the second station and the first station and the second station are commanded to begin communicating with each other by enciphering and deciphering signals using the session key and the direct propagation delay value.

Figure 8:
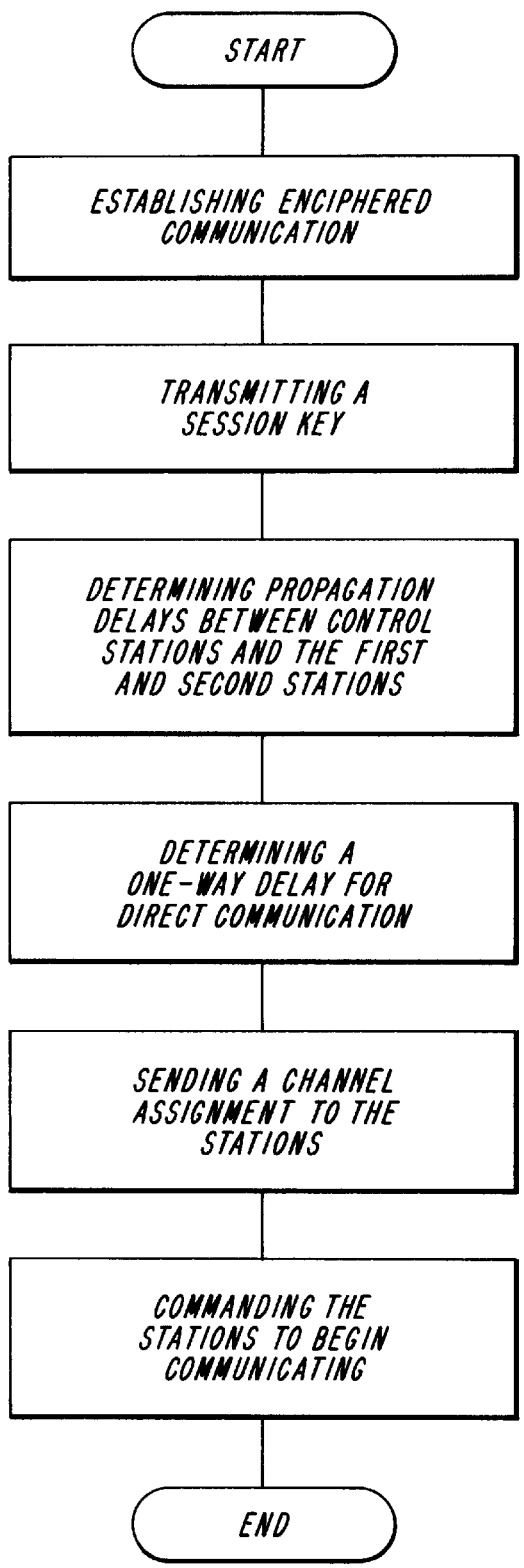
FIG. 8 is a flow chart illustrating another embodiment of the present invention.

In another embodiment of the present invention illustrated in FIG. 8, the established propagation delays for communication between the control station network and the first and second mobile stations respectively are added together. Then, the loop propagation delay from the control network back to control network is determined and subtracted to obtain a one-way delay for direct communication via the satellite between the first and second mobile stations. A channel assignment including the one-way delay is sent from the control station network to the first mobile station and separately to the second mobile station and the first and second mobile stations are commanded to begin communicating with each other using the channel assignment and enciphering and deciphering signals using the session key and the one-way propagation delay value.

In a particular implementation, the delay value used may be greater than the pure propagation delay in order to account for processing delays in the equipment for, for example, demodulation, interleaving, error correction decoding or other signal processing functions that are not instantaneously executed.

The write address after being incremented by the block clock pulse is used to direct the deciphering bits output from algorithm 11 to a particular one-block area of memory, for example a 114-bit area. The read address on the other hand is used to point to an area of memory from which a deciphering bit-block stored earlier will be retrieved and used for deciphering the information just received at receiver 13.

Of course other methods of delaying the use of the deciphering bits may be used, such as shift registers or first in first out registers (FIFO), but when the amount of delay can vary and therefore the length of the shift register or FIFO needed is not always the same, it is more practical to use a random access memory (RAM) chip with suitable addressing logic 31. All equivalent methods of delaying the use of deciphering bits output from a duplex cipher algorithm by a given link delay are however considered to lie within the spirit and scope of this invention as described by the attached claims.

In certain circumstances where the least significant counter stages of the block counter 10 use the same count modulus as the address generator 31, then it is possible to simplify the address generator 31 by using the least significant digits of the block counter 10 directly as one address and forming the other address by adding or subtracting the given delay value modulo-N.

Figure 9:
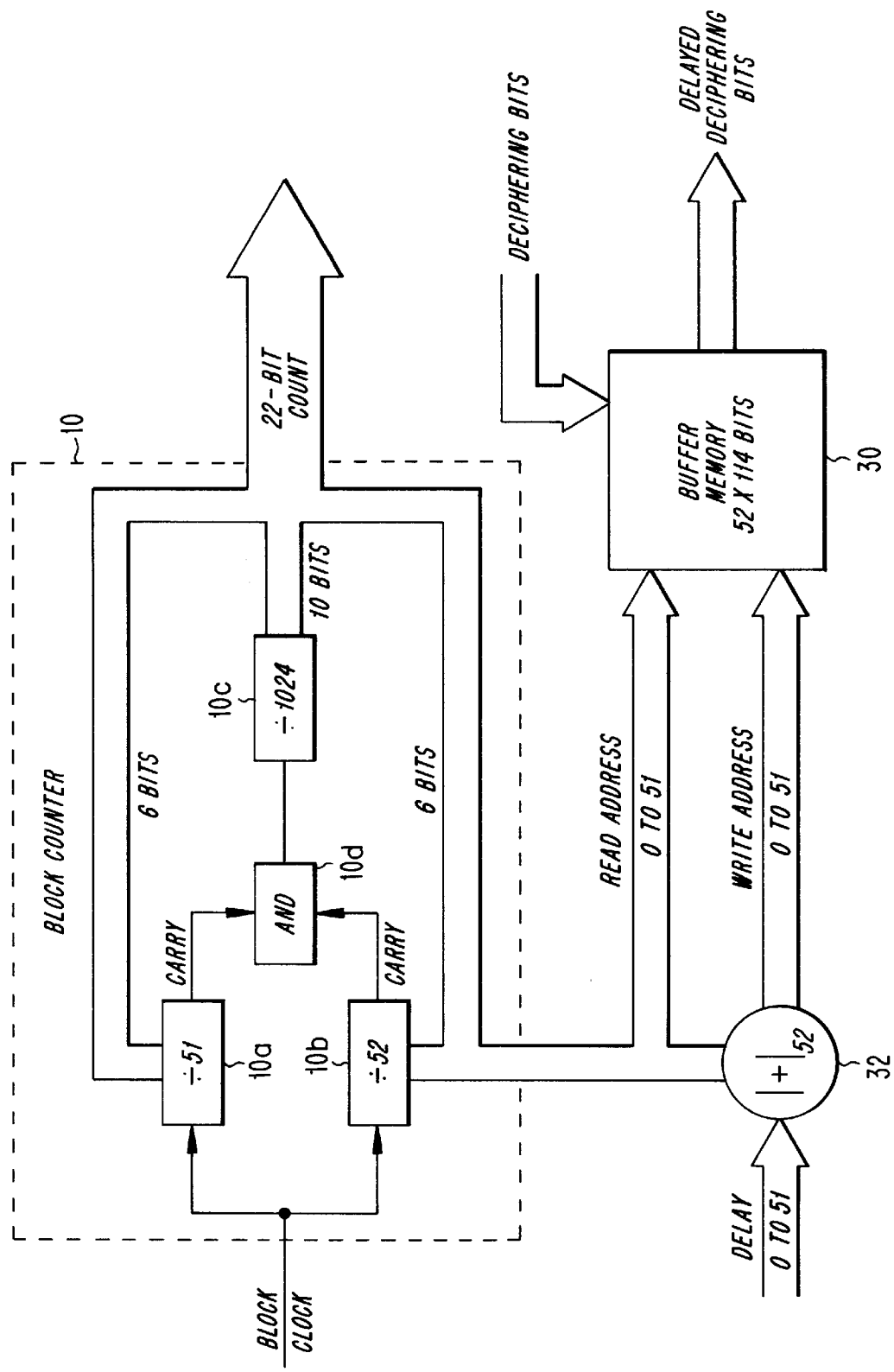
FIG. 9 illustrates the use of a block counter in an address generator according to one embodiment of the present invention.

Such an arrangement is shown in FIG. 9. The block counter 10 has been expanded to show more detail of a typical block counter, such as that used in the GSM system. A first counter LSB stage 10a divides the block clock by 51, which is the repetition period of a submultiplex frame on the broadcast control channel, as described in the incorporated references. A second counter LSB stage 10b is clocked in parallel, and divides by the number of blocks or frames between Slow Associated Control Channel (SACCH) bursts. In GSM, the counter 10b counts 52 frames of 8 times slots, but in the inventive satellite adaptation described in the incorporated references, the counter 10b counts 26, 16-slot frames. Both of the counters 10a and 10b are clocked together and generate a carry pulse simultaneously only one in 51×52 pulses, which event is detected by an AND gate 10d, generating a carry pulse to increment the most significant counter stage 10c, a divide by 1024 circuit. The total period of counter 10 is in this example 51×52×1024, however the exact counter moduli should be regarded as exemplary and not limiting of the invention. For example, the counter moduli could equally well be 51×26×2048 or 17×13× 12288 and achieve the same repetition period. The counter structure is preferably chosen to accord with slot, frame and superframe timing and multiplex structures and then its use as a cipher timebase has the advantage that, once synchronization has been obtained with the signal structure in general, cipher synchronization is also obtained without a further sync procedure.

In FIG. 9, the least significant counter 10b is also supplied as the read address to the buffer memory 30. The write address is generated by adding the one-way propagation delay value to the read address in a modulo-52 adder 32. The 22-bit block count is applied to a duplex cipher algorithm 11 along with the session key. Enciphering and deciphering bits are generated in the cipher algorithm as a function of the key and the block count. The ciphering bits are used almost immediately to encipher a transmitted information block. The deciphering bits are however stored in memory at a location given by the write address from adder 32, that location being ahead (in a circular fashion) of the address from which earlier-written deciphering bits are being read with the aid of the read address. The write address points to a free location containing deciphering bits that were read and used for deciphering some time ago, which may now be overwritten by the new output from the cipher algorithm 11. This new output will be concurrently used for enciphering in a second, similar apparatus with which a duplex communications link is established, but the enciphered bits will not be received at the first apparatus until after they have propagated over the intervening distance from the second apparatus, through a satellite relay station to the first apparatus, a distance which can be as much as 80000 Km in the case of a geostationary satellite. At the speed of light, this represents a delay of 266.6 mS, or 57.8 GSM TDMA frame periods, or 28.9 16-slot frame periods such as disclosed to be useful for satellite communication in U.S. patent application Ser. No. 08/501,575. This patent application is incorporated herein by reference in its entirety.

Thus since the mobile-to-mobile delay through the satellite when using 16-slot TDMA formats is less than 52 frames, a circular buffer memory 30 having 52 locations each capable of storing one frame's worth of deciphering bits (e.g. 114) is adequate to encompass the expected range of propagation delays.

Figure 10:
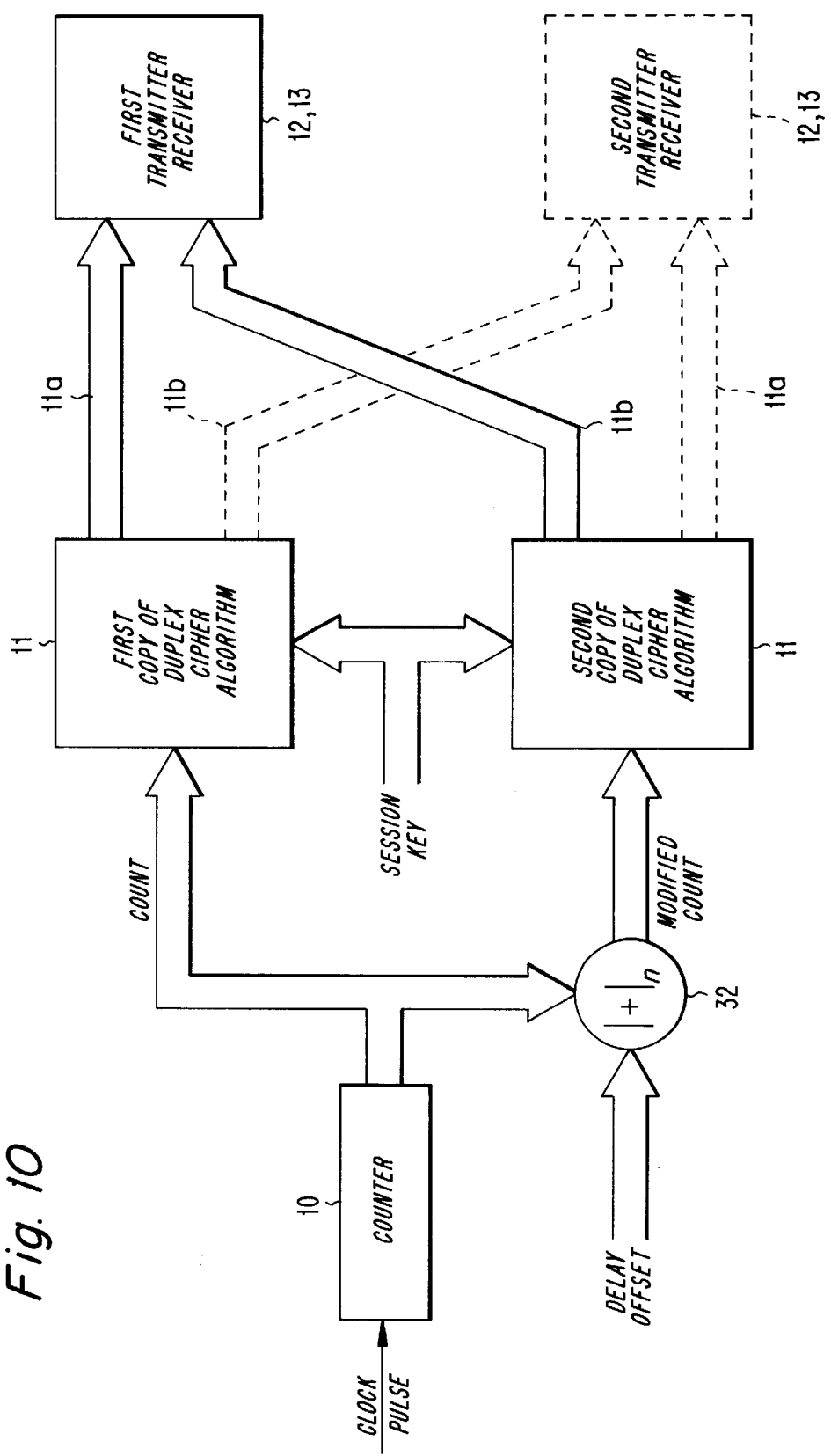
FIG. 10 illustrates an alternative implementation.

The size of the buffer memory needed for the implementations of FIGS. 6 and 9 is equal to the propagation delay multiplied by the number of ciphering bits per second to be delayed. The number of ciphering bits per second is at least equal to the information rate of the communications link and may be greater than the information rate corresponding to the redundancy added by convolutional coding. For high information rates, the memory size increases. If the memory size becomes excessive, the alternative implementation of FIG. 10, which eliminates the buffer memory, may be used. In FIG. 10, a first copy of cipher algorithm 11 is executed to combine the session key with the unmodified output of the block counter 10 to produce enciphering and deciphering outputs 11a and 11b. At one end of the duplex communication link, a first transmitter receiver 12,13 uses output 11a of the first copy of the cipher algorithm for ciphering transmissions. At the other end of the duplex communications link an identical apparatus to FIG. 10 is used to provide enciphering and deciphering bits to a second transmitter receiver 12,13 shown in dotted lines in FIG. 10. The first copy of the cipher algorithm supplies its output 11b to the second transmitter receiver for enciphering transmissions.

The modulo-n adder 32 adds a delay offset value to the output of the counter 10 to produce a modified count. The modified count is provided to a second copy of the cipher algorithm 11 (which may be a second execution of the same piece of hardware, thus justifying the common labelling of both in FIG. 10). The second copy or execution of the cipher algorithm 11 combines the modified count from the adder 32 with the session key to obtain deciphering bits 11b for use by the first receiver 13. Since the receiver receives a delayed signal, the delay offset added in the adder 32 corresponds to a negative value, that is the n's complement of the positive delay value. Alternatively, The modified count representing an incremented block counter value can be used for generating enciphering bits 11b in the first transceiver 12,13 while the unmodified counter output is used to generate deciphering bits 11a. A second transceiver 12,13 shown in dotted lines in FIG. 10 is connected in a similar arrangement to FIG. 10 but uses the output 11b of the first execution of the cipher algorithm 11 for enciphering (if output 11a is used for enciphering in the reverse direction) and output 11a of the second execution of the cipher algorithm 11 is used for deciphering at the second transceiver (assuming output 11a of the second execution of the cipher algorithm is used for deciphering in the other transceiver.) Alternatively, output 11a of the second execution of the cipher algorithm 11 is used for enciphering in the second transceiver if output 11b of the second execution of cipher algorithm 11 is used for enciphering in the first transceiver.

The modulus 'n' of the adder 32 must correspond to the full count period of the counter 10. For the counter structure illustrated in FIG. 9 comprising subcounters 10a, 10b, 10c, the adder for the implementation of FIG. 10 is not so simple as the modulo-52 adder illustrated in FIG. 9. In FIG. 9, a modified count corresponding to an earlier count did not need to be generated, as the cipher bits corresponding to the earlier count stored in the buffer memory 30. To avoid the need for the buffer memory 30 by a second execution of the cipher algorithm using the earlier count however, the full earlier count must be made available, and this involves modifying all of the subcounters 10a, 10b and 10c.

For example, suppose that the counter 10b currently contains a count of 47 and the counter 10a contains a count of 15, and that it is desired to reproduce the count value 39 blocks ago. Subtracting 39 from the counter 10b does not produce an underflow and so we know that the counter 10b did not produce a carry between the earlier count and the current count. The earlier value of the sub-counter 10a was 15−39=−24 which is +27 in modulo-51 counting. The negative sign of the −24 indicates underflow, namely that between the earlier count and the current count a carry was generated. If this carry had been generated at the same time as one on the subcounter 10b, it would indicate that the counter 10c also incremented between the earlier and current count and would therefore have to be decremented to produce the earlier count. This situation arises only when the subcounters 10a and 10b are currently equal and less than the delay value to be subtracted, and thus testing the subcounters 10a,10b for equality, prior to subtracting the delay offset modulo 51 and modulo-52 respectively, indicates whether the counter 10c must be decremented to produce a valid earlier count. Alternatively, if an incremented count is used for enciphering so that the current count represents an earlier enciphered block count to be used in deciphering, then the subcounters 10a, 10b must be incremented by the same delay offset in respective modulo-51 and modulo-52 adders, and then tested for equality after incrementing to determine if a simultaneous carry was produced necessitating adding one to the subcounter 10c to produce a valid enciphering counter value.

Figure 11:
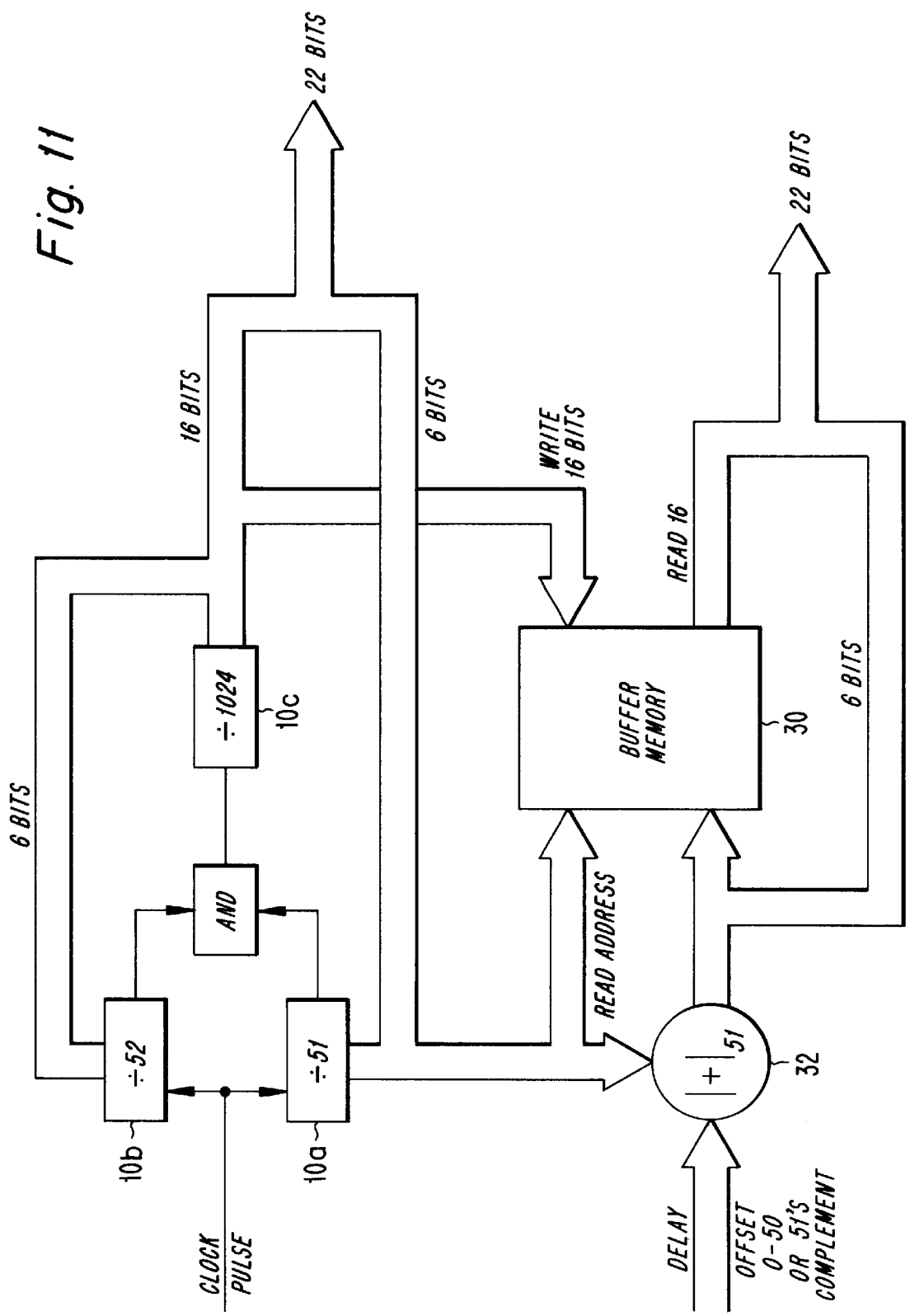
FIG. 11 illustrates saving earlier block counter values.

Yet another alternative is to use the circular buffer memory 30 of FIG. 9 to store earlier block counts instead of earlier cipher algorithm output bits, where the block count comprises fewer bits, as shown in FIG. 11.

The buffer memory 30 in FIG. 11 only needs to store the earlier counts of the subcounters 10b and 10c, a total of 16 bits, as the count of the subcounter 10a is implicit in the memory address. The current 16-bit value of the counters 10b, 10c is written to an address in the 51-word buffer memory 30 that is in advance of the current read address given by the counter 10a, the advance being equal to the delay offset added in the modulo-51 adder 32. The value written overwrites a previously re-read and used value no longer needed. When the written value is re-read later, the read address will have advanced by the delay value and thus needs to be decremented to reproduce the earlier value of the counter 10a. This may be carried out by re-using adder 32 a second time, but presenting the 51's complement of the delay to be added to the current read pointer, thus effectively subtracting the delay to reproduce the earlier value of the counter 10a. Alternatively, the unmodified value of the counter 10a may be used as the write address instead of the read address. Thus, the address from which a 16-bit value of the counters 10b, 10c will later be re-read is the corresponding value of the counter 10a to use. The current read address would then be generated by adding the 51's complement of the delay value to counter 10a's value in the modulo-51 adder 32. The current read address together with the 16-bit re-read value would then form the delayed 22-bit counter value to use in a second execution of the duplex cipher algorithm 11 for deciphering purposes, the current states of the counters 10a, 10b, 10c being used in a first execution of the cipher algorithm 11 for enciphering purposes.

Thus, the size of the buffer memory 30 may be minimized rather than being totally eliminated by using a hybrid of the implementations of FIGS. 9 and 10 as described above, as a trade off between memory size, complexity of modulo addition operations and single versus double execution of the cipher algorithm 11.

It is also pointed out that a full double-execution of the cipher algorithm is not required at any one end of the duplex communications link. If for example the first execution of the cipher algorithm 11 produces output bits 11a first for the first transceiver 12,13 in FIG. 10, it need not continue to produce output bits 11b. On the other hand, the second execution of the cipher algorithm 11 must produce output bits 11a as a stepping stone to obtaining the output bits 11b used by the first transceiver. Conversely, for the second transceiver 12,13 the second execution of the cipher algorithm 11 may terminate after producing only output bits 11a.

It is necessary for the value of "DELAY" shown being fed to the adder 32 of FIGS. 6, 9 or 10 to be established for a direct mobile-to-mobile link at call set-up. Call set-up is the name for the procedures enacted in a telephone communications network when one subscriber picks up the phone and dials the number of another subscriber. In a mobile telephone network, an important sub-procedure is to identify the calling subscriber so that he can be billed for the charges incurred during the call. This procedure is simple in a wireline network as the subscriber is uniquely identified with the pair of copper wires leading to his home, for example. In a mobile communications system however, different subscribers may come within range of and be connected to the same wireless base station, and can thus no longer be discriminated by where their signals are detected in the network. They must instead be identified for billing purposes by exchange of electronic identification signals. Other references incorporated above disclose authentication procedures designed to prevent fraud in this identification process. As a by-product of authentication, a temporary "session key" may be produced for enciphering and deciphering the call, at least over the wireless leg of the signal routing which is more readily intercepted by any eavesdropper equipped with a suitable radio receiver.

In U.S. patent application Ser. No. 08/681,916 which was incorporated herein above, it was disclosed how, at call set-up, the satellite/cellular network may also determine if a particular call is between two subscribers that are both reachable only by the satellite, and then proceed to establish a common ciphering key before allocating them a direct mobile-to-mobile satellite transponder channel. The network is first contacted by the calling subscriber dialing the call, then the network in turn contacts the called subscriber and establishes separately enciphered links with both. It is straightforward for the network, during this call set-up phase, to establish the loop delay to each mobile independently, which will include as a common part the distance between the satellite and the network station. This distance may be accurately established by any number of means such as using a satellite tracking station to accurately track the satellite, determine its orbital parameters, and compute its instantaneous position. The known distance from ground station to satellite is then subtracted from the loop delays to the first and second mobile before adding them to obtain the mobile-to-mobile delay. The satellite transponder for mobile-to-mobile communications preferably includes a buffer and reformatter (when uplink and downlink signal formats are different) U.S. patent application Ser. Nos. 08/681,916 and 08/581,110. The buffer has the effect of introducing a small extra delay in the satellite transponder such that the total propagation delay can be expressed as an integral number of TDMA, frame periods, the buffer in effect taking up the fractional-frame delay.

Figure 12:
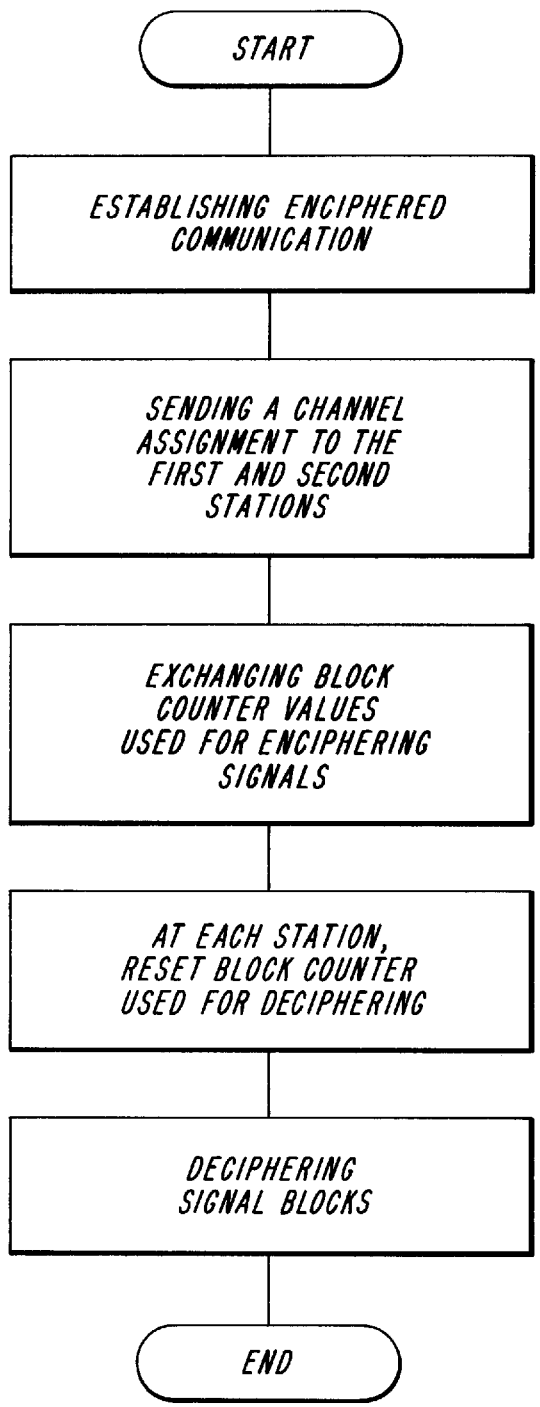
FIG. 12 is a flow chart illustrating another embodiment of the present invention.

According to the current invention, the ground network determines this integral number of frame delay from mobile-to-mobile and then communicates it along with the common session key and a mobile-to-mobile transponder channel allocation to the mobiles, thus allowing the mobiles to switch from communicating with the ground network to directly communicating in enciphered mode with the aid of the current invention. By so informing the mobiles directly of the loop delay that they will experience, they avoid a hiatus in communicating between them while a sync algorithm searches for the correct delay value to use to synchronize ciphering and deciphering at both ends. While this is a desirable aspect of the preferred implementation, other means of establishing the loop delay could be used, for example by requiring the mobiles to begin direct communication with each other by transmitting their frame counter values in an unenciphered mode as illustrated in FIG. 12. Each mobile then subtracts the counter value contained in a received burst from its current counter value to determine the delay it would add to its own counter in the adder 32 for synchronizing deciphering with the other mobile's ciphering. The latter method does not assume that both mobiles will use the same delay value exactly, and can tolerate any counter misalignment providing that the implementation of FIG. 10 is used. Both methods and any other method of establishing the loop delay value to the necessary accuracy of one block period that may be devised by persons skilled in the art are considered to lie within the spirit and scope of this invention.

It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

I claim:

1. A method of communicating cipher-protected information between a first transmitter-receiver station and a second transmitter-receiver station using a network of control stations, comprising the steps of:

establishing enciphered communication between said network of control stations and said first station and separately between said network of control stations and said second station;

communicating a session key from said network of control stations to said first station and separately to said second station;

establishing propagation delays between said control station network and said first station and separately between said control station network and said second station;

processing said propagation delays to determine a direct propagation delay for communication between said first and second stations without involving said control station network and communicating said direct propagation delay from said control station network to said first station and separately to said second station; and communicating a channel assignment from said control station network to said first station and separately to said second station and commanding said first station and said second station to begin communicating with each other by enciphering and deciphering signals using said session key and said direct propagation delay value.

2. The method according to claim 1, wherein said delay value is greater than the pure propagation delay in order to account for processing delays.

3. A communications system for communicating cipher-protected information between a first transmitter-receiver station and a second transmitter-receiver station using a network of control stations, comprising:

means for establishing enciphered communication between said network of control stations and said first station and separately between said network of control stations and said second station;

means for communicating a session key from said network of control stations to said first station and separately to said second station;

means for establishing propagation delays between said control station network and said first station and separately between said control station network and said second station;

means for processing said propagation delays to determine a direct propagation delay for communication between said first and second stations without involving said control station network and communicating said direct propagation delay from said control station network to said first station and separately to said second station; and means for communicating a channel assignment from said control station network to said first station and separately to said second station and commanding said first station and said second station to begin communicating with each other by enciphering and deciphering signals using said session key and said direct propagation delay value.

4. The communications system according to claim 1, wherein said delay value is greater than the pure propagation delay in order to account for processing delays.

5. A means of ciphering and deciphering signals transmitted between a first and a second station when signal propagation delay between said first and second stations is large compared with the duration of a ciphered information block, comprising, at each of said first and second stations, comprising:

block counter means for counting information blocks transmitted or received and producing a multi-digit block count value;

cipher algorithm execution means for generating a block of ciphering bits and a block of deciphering bits as a function of a multi-digit session key and said multi-digit block count value, the ciphering bits for said first station being the deciphering bits for said second station and vice-versa;

enciphering means for using a block of said ciphering bits to encipher a corresponding block of information bits for transmission;

circular buffer memory means for storing said deciphering bit blocks in a first memory location and retrieving previously stored deciphering bit blocks from a second memory location; and deciphering means for deciphering received signals using deciphering bit blocks retrieved from said circular buffer memory in order to reproduce blocks of information bits.

6. The apparatus according to claim 5, wherein said memory locations are incremented modulo the total number of memory locations each time said block counter is incremented.

7. The apparatus according to claim 5, wherein the difference between said first and second memory locations corresponds to the propagation delay between said first station and said second station measured in units of the time between successive information block transmissions.

8. The apparatus according to claim 5, wherein said first memory location is determined by at least some digits of said block counter including the least significant digits.

9. The apparatus according to claim 5, wherein said second memory location is formed from at least some digits of said block counter including the least significant digits.

10. The apparatus according to claim 8, wherein said second memory location is formed by modulo-addition of an offset representative of said propagation delay to said first memory location.

11. The apparatus according to claim 9, wherein said first memory location is formed by modulo-addition of an offset representative of said propagation delay to said second memory location.

12. A means of ciphering and deciphering signals transmitted between a first and a second station when signal propagation delay between said first and second stations is large compared with the duration of a ciphered information block, comprising, at each of said first and second stations, comprising:

block counter means for counting information blocks transmitted or received and producing a multi-digit block count value;

cipher algorithm execution means for generating a block of ciphering bits as a function of a multi-digit session key and said multi-digit block count value;

enciphering means for using a block of said ciphering bits to encipher a corresponding block of information bits for transmission;

modifying means for modifying said block count value using an offset representative of said propagation delay to produce an offset block count;

deciphering algorithm execution means for generating a block of deciphering bits as a function of said multi-digit session key and said offset block count; and deciphering means for deciphering received signals using said deciphering bit blocks to reproduce blocks of information bits.

13. An apparatus for ciphering and deciphering signals transmitted between a first and a second station when signal propagation delay between said first and second stations is large compared with the duration of a ciphered information block, comprising, at each of said first and second stations:

block counter means for counting information blocks transmitted or received and producing a multi-digit block count value;

cipher algorithm execution means for generating a block of ciphering bits and a block of deciphering bits as a function of a multi-digit session key and said multi-digit block count value, the ciphering bits for said first station being the deciphering bits for said second station and vice-versa;

enciphering means for using a block of said ciphering bits to encipher a corresponding block of information bits for transmission;

memory means for storing current values of said block counter and retrieving previously stored block counter values;

deciphering algorithm execution means for generating a block of deciphering bits as a function of said multi-digit session key and said retrieved block count values; and deciphering means for deciphering received signals using said deciphering bit blocks to reproduce blocks of information bits.

14. In a satellite communications system for providing communications services between mobile subscribers having mobile telephone stations and subscribers of the public switched telecommunications network via a network of control stations, a method of facilitating direct, one-hop, enciphered communications between a first mobile station and a second mobile station through a satellite relay station, comprising the steps of:

establishing enciphered communication between said network of control stations and said first mobile station via said satellite relay station and separately between said network of control stations and said second mobile station via said same satellite relay station;

communicating a session key from said network of control stations to said first mobile station and separately to said second mobile station via said satellite relay station;

establishing respective propagation delays between said network of control stations and said first and second mobile stations via said satellite relay station and separately the loop propagation delay from said control station network via said satellite relay station and back again;

adding said established propagation delays for communication between said control station network and said first and second mobile stations respectively and subtracting said loop propagation delay to obtain the one-way delay for direct communication via said satellite between said first and second mobile stations; and communicating a channel assignment including said one-way delay from said control station network to said first mobile station and separately to said second mobile station and commanding said first and second mobile stations to begin communicating with each other using said channel assignment and enciphering and deciphering signals using said session key and said one-way propagation delay value.

15. A satellite communications system for providing communications services between mobile subscribers having mobile telephone stations and subscribers of the public switched telecommunications network via a network of control stations, which provides direct, one-hop, enciphered communications between a first mobile station and a second mobile station through a satellite relay station, comprising:

means for establishing enciphered communication between said network of control stations and said first mobile station via said satellite relay station and separately between said network of control stations and said second mobile station via said same satellite relay station;

means for communicating a session key from said network of control stations to said first mobile station and separately to said second mobile station via said satellite relay station;

means for establishing respective propagation delays between said network of control stations and said first and second mobile stations via said satellite relay station and separately the loop propagation delay from said control station network via said satellite relay station and back again;

means for adding said established propagation delays for communication between said control station network and said first and second mobile stations respectively and subtracting said loop propagation delay to obtain the one-way delay for direct communication via said satellite between said first and second mobile stations; and means for communicating a channel assignment including said one-way delay from said control station network to said first mobile station and separately to said second mobile station and commanding said first and second mobile stations to begin communicating with each other using said channel assignment and enciphering and deciphering signals using said session key and said one-way propagation delay value.

16. A method of establishing enciphered communication between a first transmitter-receiver station and a second transmitter-receiver station using a network of control stations, comprising the steps of:

establishing enciphered communication between said network of control stations and said first station and separately between said network of control stations and said second station;

communicating a channel assignment including a session key from said network of control stations to said first station and separately to said second station;

using said channel assignment to communicate between said first and second stations to exchange in an unencrypted mode block counter values used for enciphering signals transmitted by respective stations;

using the block counter value received at said first station from said second station to reset a block counter used for deciphering signal blocks received at said first station and using the block counter value received from said first station at said second station to reset a counter used for deciphering signal blocks received at said second station; and deciphering signal blocks received at respective stations using respective deciphering counter values and said session key and enciphering information blocks at respective stations using said session key together with respective enciphering counter values, incrementing said enciphering and deciphering block counters after each information block for transmission is enciphered or each received signal block is deciphered respectively.

17. A communications system for establishing enciphered communication between a first transmitter-receiver station and a second transmitter-receiver station using a network of control stations, comprising:

means for establishing enciphered communication between said network of control stations and said first station and separately between said network of control stations and said second station;

means for communicating a channel assignment including a session key from said network of control stations to said first station and separately to said second station;

means for using said channel assignment to communicate between said first and second stations to exchange in an unencrypted mode block counter values used for enciphering signals transmitted by respective stations;

means for using the block counter value received at said first station from said second station to reset a block counter used for deciphering signal blocks received at said first station and using the block counter value received from said first station at said second station to reset a counter used for deciphering signal blocks received at said second station; and means for deciphering signal blocks received at respective stations using respective deciphering counter values and said session key and enciphering information blocks at respective stations using said session key together with respective enciphering counter values, incrementing said enciphering and deciphering block counters after each information block for transmission is enciphered or each received signal block is deciphered respectively.

* * * * *